UNITED STATES PATENT OFFICE.

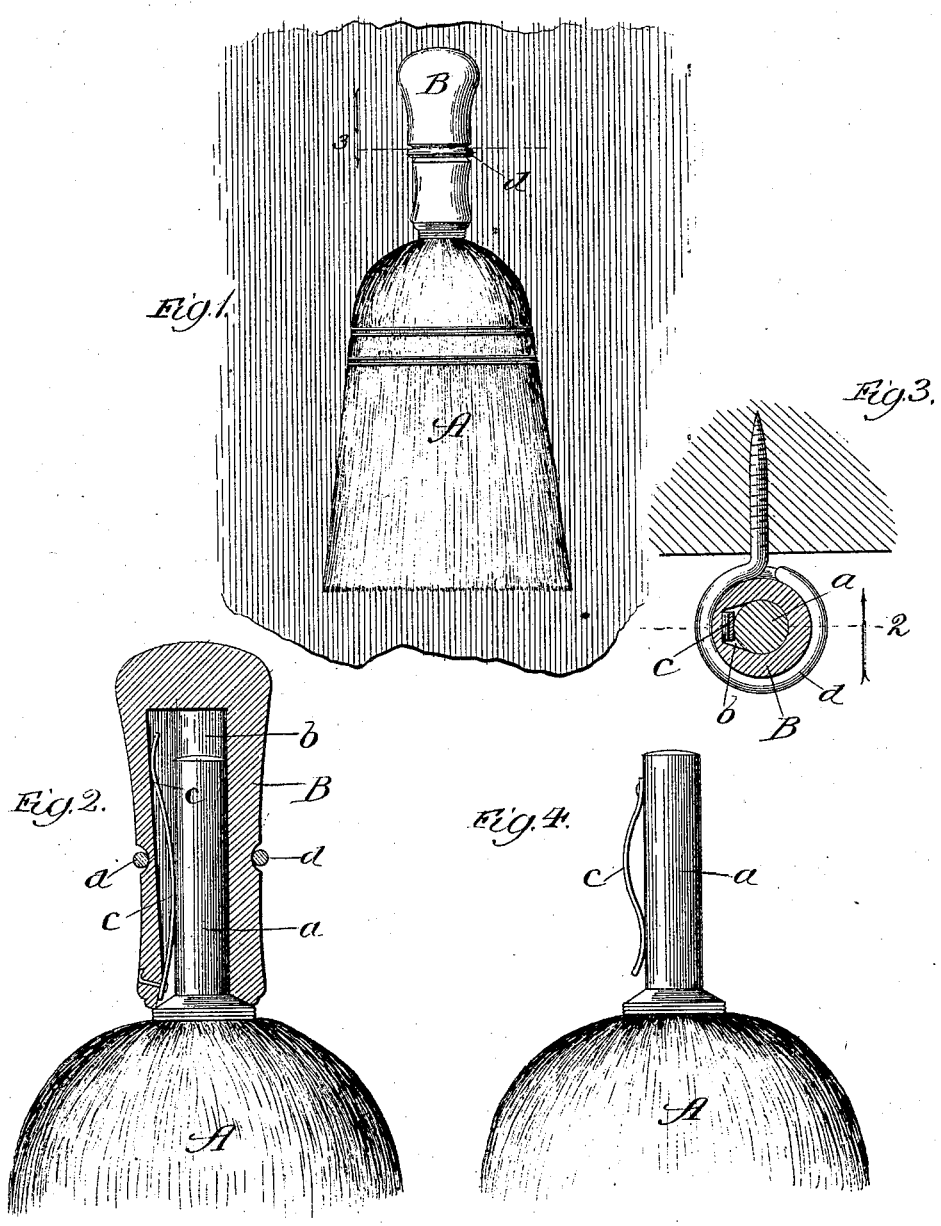

WILLIS FLANDERS, OF CHICAGO, ILLINOIS.

BROOM-HOLDER.

SPECIFICATION forming part of Letters Patent No. 673,430, dated May 7, 1901.

Application filed January 2, 1900. Serial No. 116. (No model.)

*To all whom it may concern:*

Be it known that I, WILLIS FLANDERS, a citizen of the United States, and a resident of Chicago, in the county of Cook and State of Illinois, have invented a certain new and useful Improvement in Broom-Holders, of which the following is a specification.

The object of my invention is to construct a simple and efficient broom-holder by means of which the broom can be located and supported as desired to be readily accessible for use and so as to permit of the ready insertion of the broom into and withdrawal from the holder without trouble or inconvenience.

The invention consists in providing a broom-holder adapted to be secured to a door or a window casing or the wall of a room or other place of use and combining therewith a retaining spring or clasp by means of which the broom will be held securely in the holder and yet be capable of ready detachment for use, as hereinafter more particularly described and claimed.

In the drawings, Figure 1 is an elevation showing the broom-holder with the broom held therein; Fig. 2, a longitudinal section taken on line 2 of Fig. 3 looking in the direction of the arrow; Fig. 3, a transverse section taken on line 3 of Fig. 1 looking in the direction of the arrow, but not showing the broom; Fig. 4, an elevation showing the broom removed from the holder and the retaining spring or clasp attached to the stem of the broom instead of to the holder.

In carrying out my invention I use an ordinary whisk-broom A, which may be of any well-known form of construction as to the broom proper, and provide the same with a stem or shank *a* of a circular or other desired shape in cross-section. The stem or shank is adapted to enter a socket or hole *b*, corresponding in cross-section to the shape of the stem and formed in the holder or retainer B. The socket or hole is of a larger diameter or of increased dimensions in cross-section in one direction at least than the stem. As shown in Fig. 2, a pressure or retaining spring or clasp C is secured at one end of the holder; but instead of having the spring attached to the holder within the socket it can be attached at one end to the stem of the broom-holder, as shown in Fig. 4. The pressure spring or clasp C in either case is to have sufficient force to hold the stem in place when inserted in the socket without interfering with the easy withdrawal of the stem from the socket by the application of a little force. The holder or retainer B is encircled by a loop or eye *d* of an eye-screw in the arrangement shown, the stem of which is screw-threaded, as usual, for entering into the support to which the holder is to be attached.

The holder or retainer B may have its exterior formed so as to have the contour or resemblance of a handle for the broom, and thus give, when the broom is in the holder or retainer, the appearance of an ordinary whisk-broom; but it is to be understood that the holder or retainer can have an exterior of any desired form. The holder or retainer is secured in the position desired by means of the eye-screw when used or by other means or in any other suitable manner and can be arranged to lie horizontal or to stand vertical, as shown in the drawings, or otherwise. The broom is held in place by inserting the stem thereof into the socket of the holder or retainer, where it will be pressed and held by the spring or clasp against withdrawal except by the application of force. When it is desired to use the broom, all that is necessary is to withdraw the stem from the socket, which is readily done by the employment of a little force, when the broom can be used, and in use the stem or shank will serve as a handle, if so desired, and after use the broom can be replaced and held in the socket or retainer.

A flat-faced spring formed from a strip of steel or other metal or a wire spring or a rubber cushion having a yielding and spring action may be used, so long as the spring or clasp is of a nature and form to exert the necessary pressure for retaining the broom in position when its stem is inserted in the holder or retainer.

The device is simple in construction and in operation will be found very desirable and effectual for the purpose of holding a broom, as it will permit the ready withdrawal of the broom for use and its return after use without any great inconvenience or trouble and without any further requirement than withdrawing and inserting the stem, and the combined effect of the broom when in the holder or retainer will not be unsightly, as the two will present or have the appearance of a complete broom.

I claim—

The combination with a holder or retainer having a longitudinal central socket or hole in and an exterior circumferential groove on its body, of a broom, a stem for the broom having a less diameter than the diameter of the longitudinal socket or hole, a retaining-spring operating against the stem when entered into the socket or hole and securing the broom in the holder or retainer, and a loop encircling the body of the holder or retainer and engaging with the exterior circumferential groove and having a screw-threaded stem for securing the holder or retainer in an elevated position, substantially as described.

WILLIS FLANDERS.

Witnesses:
 THOMAS B. MCGREGOR,
 G. E. VON HOFFMANN.